United States Patent [19]

Briski

[11] 3,927,830
[45] Dec. 23, 1975

[54] CONTROL VALVE
[75] Inventor: Michael Briski, Rockford, Ill.
[73] Assignee: Borg-Warner Corporation, Chicago, Ill.
[22] Filed: Sept. 25, 1974
[21] Appl. No.: 508,976

[52] U.S. Cl. ........ 236/100; 123/41.12; 137/625.68; 192/82 T
[51] Int. Cl.² .......................................... G05D 23/12
[58] Field of Search ............... 123/41.12; 192/82 T; 236/80, 86, 100; 137/625.68, 625.69

[56] References Cited
UNITED STATES PATENTS

| | | | |
|---|---|---|---|
| 2,899,939 | 8/1959 | Norris | 137/625.69 |
| 3,195,559 | 7/1965 | Stacey | 137/625.68 X |
| 3,318,333 | 5/1967 | McCollum et al. | 137/625.69 |
| 3,436,017 | 4/1969 | Elmer | 236/92 R |
| 3,473,557 | 10/1969 | Loe | 137/625.68 X |
| 3,473,566 | 10/1969 | Peppel | 137/625.69 X |
| 3,545,479 | 12/1970 | Loe | 137/625.68 X |

*Primary Examiner*—William E. Wayner
*Assistant Examiner*—William E. Tapolcai, Jr.
*Attorney, Agent, or Firm*—Herman E. Smith

[57] ABSTRACT

A fluid pressure control valve having a spool responsive to pressure and a thermal sensing device provides a maximum regulated pressure below the lower threshold of a temperature range, and provides a regulated pressure varying inversely with temperature within the temperature range.

7 Claims, 2 Drawing Figures

CONTROL VALVE

SUMMARY OF THE INVENTION

The present invention relates generally to fluid pressure control valves and more particularly to an improved valve providing for adjustability of response.

Among the objects of the invention are to provide a control valve capable of regulating pressure as a function of temperature within a selected range of temperature, another object is to provide a valve capable of limiting maximum output pressure when the temperature is below a selected range, another object is to provide an adjustable valve affording more precise selection of its temperature and pressure response characteristics, and still another object is to provide a control valve particularly adapted for regulating air flow in heat exchange apparatus such as by controlling movable shutters or a variable speed fan drive in accordance with a sensed temperature.

DESCRIPTION OF THE PREFERRED EMBODIMENTS

Figure 1:
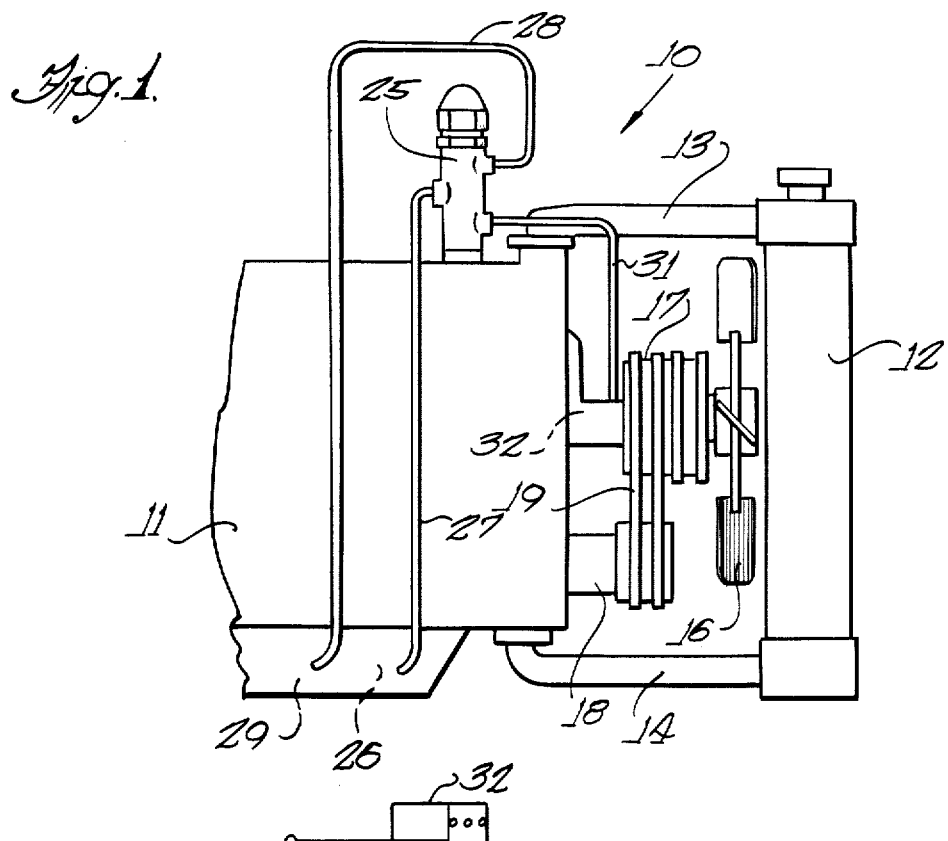
FIG. 1 is a fragmentary schematic view of heat exchange apparatus employing a valve according to the present invention.

Referring now to the drawing, the reference character 10 generally indicates heat exchange apparatus for a liquid cooled internal combustion engine 11. A heat exchanger 12 is connected to appropriate portions of the engine by means of conduits 13 and 14. A fan 16 is driven by a variable speed drive 17 and arranged for inducing air flow through heat exchanger 12. Variable speed drive 17 can be driven from engine 11 by means of shaft 18 and V-belts 19.

A temperature responsive control valve 25 is mounted for sensing the temperature of coolant and is connected to a pump 26 or other source of fluid pressure by means of an inlet conduit 27. A relief conduit 28 is connected between a portion of valve 25 and a sump 29. A control conduit 31 is connected between a portion of valve 25 and a control member 32 which is capable of regulating the output speed of variable speed drive 17. Preferably the variable speed drive is of the slippable wet clutch type in which the clutch engaging force is varied to regulate the fan speed. A suitable form of such device employs an engaging spring to provide maximum engaging force (high speed) and a fluid pressure chamber acting in opposition to the spring such that an increase in fluid pressure in the chamber results in a reduction in the net engaging force (lower speed). Control valve 25 is particularly adapted for providing fluid pressure regulated inversely with temperature for application to a chamber as described above. Control valve 25 is not limited for use only with the above described device, but may be used with other forms of variable speed devices and may be used for controlling other devices such as air control shutters on a cooling tower.

Figure 2:
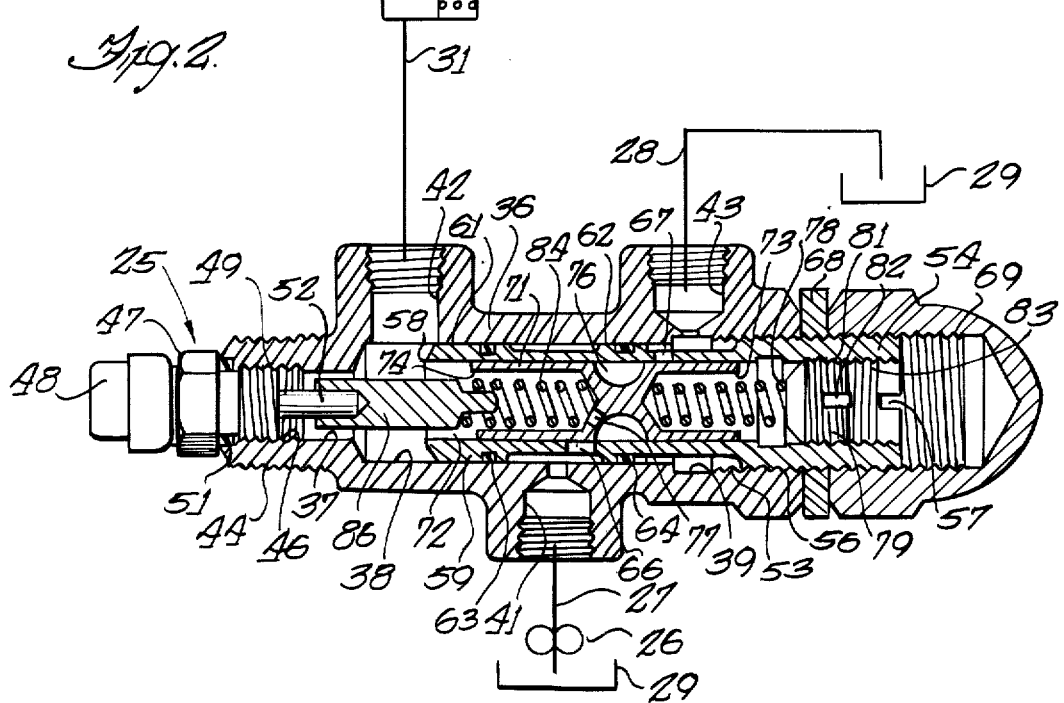
FIG. 2 is a section view of a valve according to the present invention.

Referring now to FIG. 2 of the drawing, control valve 25 will be described in more detail. Control valve 25 has a body 36 including a stepped longitudinally extending bore 37, 38, 39. An inlet port 41 is formed in body 36 and intercepts bore 38. A control port 42 is formed in body 36 and intercepts bore 38 adjacent stepped portion 37. A relief port 43 is formed in body 36 and intercepts stepped bore portion 39. Each of the ports is provided with appropriate means such as screw threads for connection to respective conduits. One end of body 36 is formed with an externally threaded fitting 44 for insertion through a wall of a cooling system. Stepped bore 37 is provided with internal threads 46 for receiving a thermal sensing device 47. An end 48 of thermal device 47 extends outwardly of body 36 for contact with the coolant. Another portion of thermal device 47 includes threads 49 engaging threads 46 to form a fluid tight seal. A seal ring 51 may be employed in addition to threads 46, 49 for assuring a fluid tight joint. A movable plunger 52 of thermal device 47 extends within bore 37 of body 36, the plunger being extensible in response to temperature rise and retractible in response to temperature drop as sensed by end 48 of thermal device 47.

Bore portion 39 includes an internally threaded portion 53 for adjustably receiving a tubular sleeve 54. The tubular sleeve has an externally threaded portion 56 engaged with threaded portion 53 and is provided with a slot 57 by which the sleeve can be turned for adjusting its longitudinal position within body 36. Sleeve 54 has an open end 58 communicating with control port 42. The wall 59 of sleeve 54 has a pair of land surfaces 61, 62 extending within bore 38, each being provided with a seal ring 63, 64 engaging bore 38. An inlet aperture 66 is formed in wall 59 between seal rings 63, 64 communicating with inlet port 41. A relief aperture 67 is formed in wall 59 between seal ring 64 and threaded portion 56 communicating with relief port 43. A lock nut 68 engages threaded portion 56 and body 36 for securing sleeve 54 with respect to the body. A cap 69 can be screwed on the outer end of sleeve 54 to protect threads 56 from dirt and damage.

A shifting spool 71 is slidable within the inner surface 72 of sleeve 54. Cavities 73, 74 extend inwardly from opposite ends of spool 71. A circumferential groove 76 and opening 77 form passage means communicating with open end 58 of sleeve 54 by way of cavity 74, and communicable with inlet aperture 66 or relief aperture 67 depending upon the position of spool 71 within sleeve 54.

A relief spring 78 is received within cavity 73 of spool 71 and bears against the spool and adjustable spring seat 79. Spring seat 79 includes slot 82 and threads 81 engaging threads 83 of sleeve 54 for adjusting the position of the spring seat.

A regulator spring 84 is received within cavity 74 and bears against spool 71 and a strut 86 extending from plunger 52 of thermal device 47.

OPERATION

The structural features of the valve, having been described above, an example of the operation of the valve will be described.

When the temperature sensed by end 48 of thermal device 47 is below the threshold of a selected temperature range, the relief spring 78 urges spool 71 toward the open end 58 of sleeve 54 such that passage means 76, 77 communicates inlet port 41 with control port 42, at least momentarily, until the pressure in control port 42 reaches a value sufficient to urge spool 71 in the opposite direction compressing relief spring 78 and closing inlet aperture 66. This results in trapping a predetermined maximum pressure in the control port and associated conduits when the temperature is below a selected range. As the temperature sensed by end 48 of thermal device 47 increases, plunger 52 extends further into bore 37, 38 compressing regulator spring 84 which urges spool 71 further against relief spring 78 such that fluid is bled through relief aperture 67 to sump 29. The bleeding of fluid through relief aperture 67 reduces the pressure in control port 42. Thus as the temperature increases, the pressure in the control port is reduced until a minimum pressure exists at an upper temperature of the temperature range. When the sensed temperature falls, the spool moves in a direction toward the open end of sleeve 54 such that fluid is bled through inlet aperture 66 for increasing the pressure in control port 42.

The maximum pressure available in the control port 42 is selected by adjusting spring seat 79 with respect to sleeve 54 while the temperature of the sensing unit is below the threshold of the selected range. The adjustable spring seat determines a preload on the regulator spring sufficient to permit the spool to close inlet aperture 66 under the influence of the desired maximum pressure in the control port without assistance from the thermal device.

The lower threshold temperature of the temperature range is selected by adjusting sleeve 54 toward or from the thermal device such that the combined force of the maximum pressure and the force of the regulator spring is sufficient to cause the spool to open relief aperture 67.

When control valve 25 is used for regulating a variable speed fan drive of the type in which fluid pressure is employed for reducing the net engaging force and speed of the fan, the operation is as follows. When the coolant temperature is below the desired threshold temperature, valve 25 supplies a predetermined maximum pressure available to the control device which provides a minimum net engaging force and minimum fan speed. As the temperature of the coolant increases above the threshold temperature, valve 25 reduces the pressure available to the control device which increases the net engaging force and increases the fan speed. As the temperature of the coolant drops due to increased fan speed, the control valve increases the pressure in the control device which again decreases the net engaging force and fan speed.

The above described control valve is particularly adapted for use with heat exchanger control apparatus inasmuch as means are provided for selecting the maximum working pressure and the threshold temperature at which the apparatus becomes operative.

What is claimed is:

1. A control valve for regulating fluid pressure comprising:
    a body member including a bore, a control port, an inlet port and a relief port, each of said ports intercepting said bore;
    a tubular sleeve disposed within said bore having an open end thereof arranged for communication with said control port and including a relief aperture and an inlet aperture defined in a wall thereof, said apertures communicating respectively with said relief port and said inlet port, and sleeve including adjustment means for adjustably securing said sleeve within said bore for locating said apertures with respect to said body member for varying the response of said control valve;
    a shifting spool slidably disposed within said sleeve for movement with respect to said inlet and relief apertures, said spool including passage means communicating with said open end of said sleeve and communicable with said inlet or relief aperture in response to shifting movement of said spool;
    bias means engaging said spool;
    a thermal sensing device operatively associated with said spool;
    said spool being shiftable in response to pressure in said control port and temperature sensed by said thermal sensing device;
    whereby said spool is effective to limit the maximum pressure available in said control port when the sensed temperature is below a selected temperature range and to reduce the pressure in said control port as said temperature increases within said range.

2. A control valve according to claim 1, wherein said bias means is provided by a relief spring engaging said spool and said sleeve urging said spool toward a first position providing for communication of said passage means with said inlet aperture, said thermal sensing device being secured to said body and having a movable portion disposed within said bore adjacent said open end of said sleeve urging said spool toward a second position providing communication of said passage means with said relief aperture in response to temperature rise.

3. A control valve according to claim 1, wherein said biasing means comprises a relief spring, said sleeve including an adjustable spring seat engaging said relief spring, said sleeve being adjustable along said bore for selecting the lower temperature of said temperature range, and said spring seat being adjustable with respect to said sleeve for selecting the maximum pressure available in said control port.

4. A control valve for regulating fluid pressure comprising:
    a body member including a bore, a control port, an inlet port and a relief port, each of said ports intercepting said bore;
    a tubular sleeve disposed for longitudinal adjustment within said bore having an open end arranged for communication with said control port and including a relief aperture and an inlet aperture communicating respectively with said relief port and said inlet port;
    a shifting spool slidably disposed within said sleeve for movement with respect to said inlet and relief apertures, said spool having passage means including a circumferential groove communicable with said apertures and an opening communicating said groove with an end portion of said spool communicating with said open end of said sleeve;
    bias means engaging said spool; and
    a thermal sensing device operatively associated with said spool, said spool being shiftable in response to pressure in said control port and temperature sensed by said thermal sensing device.

5. A control valve according to claim 4, wherein said spool includes a cavity extending inwardly from one end thereof adjacent said open end of said tubular sleeve, said opening communicating said groove with said cavity.

6. A control valve according to claim 5, including a regulator spring extending within said cavity providing a portion of an operative connection between said thermal sensing device and said spool.

7. A control valve according to claim 5, wherein said spool includes a second cavity extending inwardly from an opposite end thereof, said second cavity receiving a portion of a relief spring providing said biasing means.

* * * * *

UNITED STATES PATENT OFFICE
CERTIFICATE OF CORRECTION

PATENT NO. : 3,927,830
DATED : December 23, 1975
INVENTOR(S) : Michael Briski

It is certified that error appears in the above—identified patent and that said Letters Patent are hereby corrected as shown below:

Column 3, line 64, cancel "and" (second occurrence), and insert -- said --.

Signed and Sealed this sixteenth Day of March 1976

[SEAL]

Attest:

RUTH C. MASON
Attesting Officer

C. MARSHALL DANN
Commissioner of Patents and Trademarks